United States Patent
Ortmann et al.

(10) Patent No.: US 8,033,349 B2
(45) Date of Patent: Oct. 11, 2011

(54) AUTO-SEEK ELECTRICAL CONNECTION FOR A PLUG-IN HYBRID ELECTRIC VEHICLE

(75) Inventors: Walter Joseph Ortmann, Saline, MI (US); Brandon R Masterson, Dexter, MI (US); Marvin Paul Kraska, Dearborn, MI (US); Daniel Scott Colvin, Farmington Hills, MI (US); Steve Reeves, IV, Southfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 18 days.

(21) Appl. No.: 12/402,563

(22) Filed: Mar. 12, 2009

(65) Prior Publication Data

US 2010/0230197 A1    Sep. 16, 2010

(51) Int. Cl.
*G01C 22/00*    (2006.01)
(52) U.S. Cl. .................. 180/65.1; 701/23; 701/25
(58) Field of Classification Search ........... 180/65.1, 180/65.21, 65.28, 65.285, 65.29; 701/23, 701/24, 25, 28
See application file for complete search history.

(56) References Cited

U.S. PATENT DOCUMENTS

| | | | |
|---|---|---|---|
| 5,461,298 A | 10/1995 | Lara et al. | |
| 5,498,948 A | 3/1996 | Bruni et al. | |
| 5,646,500 A | 7/1997 | Wilson | |
| 5,654,621 A | 8/1997 | Seelig | |
| 5,850,135 A * | 12/1998 | Kuki et al. | 320/108 |
| 6,157,162 A * | 12/2000 | Hayashi et al. | 320/104 |
| 6,421,600 B1 * | 7/2002 | Ross | 701/117 |
| 6,459,966 B2 * | 10/2002 | Nakano et al. | 701/23 |
| 6,516,262 B2 * | 2/2003 | Takenaga et al. | 701/96 |
| 6,764,373 B1 * | 7/2004 | Osawa et al. | 446/175 |
| 6,801,125 B1 | 10/2004 | McGregor et al. | |
| 7,309,075 B2 | 12/2007 | Ramsey et al. | |
| 7,613,556 B2 * | 11/2009 | Arima et al. | 701/41 |
| 2005/0209762 A1 | 9/2005 | Lu et al. | |
| 2005/0209763 A1 | 9/2005 | Offerle et al. | |
| 2007/0126395 A1 | 6/2007 | Suchar | |

FOREIGN PATENT DOCUMENTS

| | | |
|---|---|---|
| DE | 102008046215 | 9/2009 |
| FR | 2877110 | 4/2006 |
| JP | 06078410 | 3/1994 |
| WO | 2010/040962 | 4/2010 |

OTHER PUBLICATIONS

GB Search Report for GB1003714.1 dated Jul. 9, 2010.

* cited by examiner

*Primary Examiner* — J. Allen Shriver, II
*Assistant Examiner* — Erez Gurari
(74) *Attorney, Agent, or Firm* — Brooks Kushman P.C.

(57) ABSTRACT

An auto-seek operating mode for a vehicle adjusts the vehicle in a direction transverse to a vehicle central axis using a vehicle power steering system and using a motor and a battery to advance the vehicle toward a target connector for a utility power grid for charging the battery. If needed, vertical vehicle position adjustments are made using a controllable vehicle suspension system.

9 Claims, 3 Drawing Sheets

AUTO-SEEK ELECTRICAL CONNECTION FOR A PLUG-IN HYBRID ELECTRIC VEHICLE

BACKGROUND OF THE INVENTION

1. Field of the Invention

The invention relates to a hybrid electric vehicle and a charging system for charging a traction battery.

2. Background Art

A hybrid electric vehicle powertrain typically has two power sources, one of which may be an internal combustion engine and the other of which is an electric motor. A high voltage battery, the motor and a generator are electrically coupled using a high voltage bus. Each power source is drivably connected to vehicle traction wheels through transmission gearing. In a so-called power-split hybrid electric vehicle (HEV) powertrain configuration, the engine and the generator are drivably coupled using a gear set, usually a planetary gear set, thereby establishing parallel torque flow paths to the transmission wheels. The motor may act with the engine to complement mechanical torque delivery to the traction wheels, or it may act as a generator to charge the battery in a power regenerative mode. Another configuration for a hybrid electric vehicle powertrain is a series configuration of an engine, a generator and a motor wherein the battery acts as an energy storage system for the generator and the motor.

The two power sources of a power-split hybrid electric vehicle (HEV) work together seamlessly to meet a driver's torque demand without exceeding powertrain system limits, including battery state-of-charge limits, while optimizing the total powertrain system efficiency and performance. A vehicle system controller will interpret a driver's demand for torque and then determine when and how much torque each power source needs to provide to achieve target fuel economy, emissions quality and drivability standards. In a series HEV configuration, on the other hand, an engine drives a generator, which in turn drives a motor that is mechanically coupled to the vehicle traction wheels. Again, a battery, which acts as an energy storage device, is capable of providing motive power to the motor or accepting a charge from the generator depending upon the state-of-charge of the battery.

Another general category of a hybrid electric vehicle powertrain is referred to as a plug-in hybrid electric vehicle (PHEV) powertrain that includes a controller for determining power delivery from each of the two power sources using a battery charge depletion strategy. Unlike the control strategy for a parallel hybrid electric vehicle configuration and a series configuration, the battery is charged using an electric utility power grid following vehicle operation in which the electric motor may be the sole power source until the state-of-charge reaches a low threshold.

A first type of a plug-in hybrid electric vehicle (PHEV) powertrain uses the engine to drive a generator, which in turn charges the battery that powers the motor after a low battery state-of-charge is reached. In another type of a PHEV, only an electric motor drive is available whereby the vehicle drive range would be determined only by the state-of-charge of the battery.

In such PHEV powertrains, the power grid will charge the battery when the vehicle is not being used; e.g., when the vehicle is parked overnight. The driver may connect the vehicle battery to the power grid following partial depletion of the battery charge by using a specially designed extension cable to plug one end into a wall socket in a residence or garage, the other end being connected to a terminal on the vehicle. When the vehicle owner wishes to use the vehicle, the cable would be removed to disconnect the vehicle and the wall socket. This is an inconvenience that the owner of a conventional vehicle does not have. If the owner, through oversight, fails to plug-in the vehicle following vehicle operation during which the battery state-of-charge becomes partially depleted, the benefit of the plug-in hybrid would be eliminated; for example, when the vehicle is to be used after the vehicle has been parked over night.

SUMMARY OF THE INVENTION

The invention comprises an operating strategy that can provide a so-called "auto-seek" operating mode. It uses electrical plug-in connector elements to automatically connect the vehicle's electrical system to a utility electrical grid for charging the battery. The connector elements will have built-in vehicle position sensors that can be identified by the vehicle specifications. One position sensor can be any short range radio frequency sensor or an optical type sensor, such as a sensor for a laser or other retro-reflective signal. Whenever the front of the vehicle is within a specified distance to a target connection point, the driver may place the vehicle in a so-called auto-seek plug-in connection mode. This mode automatically positions the vehicle to line up the vehicle side of the connector with the grid side.

When the driver initiates the auto-seek plug-in connection operating mode, the control system will use the position sensors to detect the position of a grid connector element relative to the vehicle and then determine a trajectory that maps the position of a vehicle-mounted connector element relative to the grid connector element in an optimal fashion. That information may be combined with a known, front-looking object detector and a known roll/pitch/yaw sensor that would be included in an adjustable stability control for inclination and height adjustments to further improve the accuracy of the auto-seek system. Using the vehicle electric motor drive, a closed-loop control system will guide the vehicle to where the connector elements are aligned and then complete the connection. After the connection is made, the vehicle system controller will initiate a vehicle shut down.

In the auto-seek mode, the motor will provide fore-and-aft motion and an electric power assist steering system (EPAS) will be used to steer the vehicle. If a controllable vehicle suspension system is available, it may be used to provide vertical alignment. The driver maintains control of the vehicle using a manual "over-ride" switch. A display can be used in the vehicle passenger compartment to show visually how the two position sensor connector elements are aligned and to inform the driver that a connection is successful or unsuccessful.

If the connector elements are misaligned, the vehicle will stop before contact is made and the control system will provide a message telling the operator to park the vehicle so that the grid connector element and the vehicle-mounted connector element can be modified before proceeding further with the auto-seek mode. In vehicles equipped with a controllable suspension system, the vehicle can be raised or lowered using the controllable suspension system to move the vehicle connector elements within its limited range of operation. To ensure safe operation, speeds and torques may be limited. Front view cameras also may be used to detect obstacles as the vehicle is moved under electric motor power.

The auto-seek system normally would be set up in a garage. Thus, the vehicle would be parked in the same position each day.

PARTICULAR DESCRIPTION OF AN EMBODIMENT OF THE INVENTION

Figure 1:
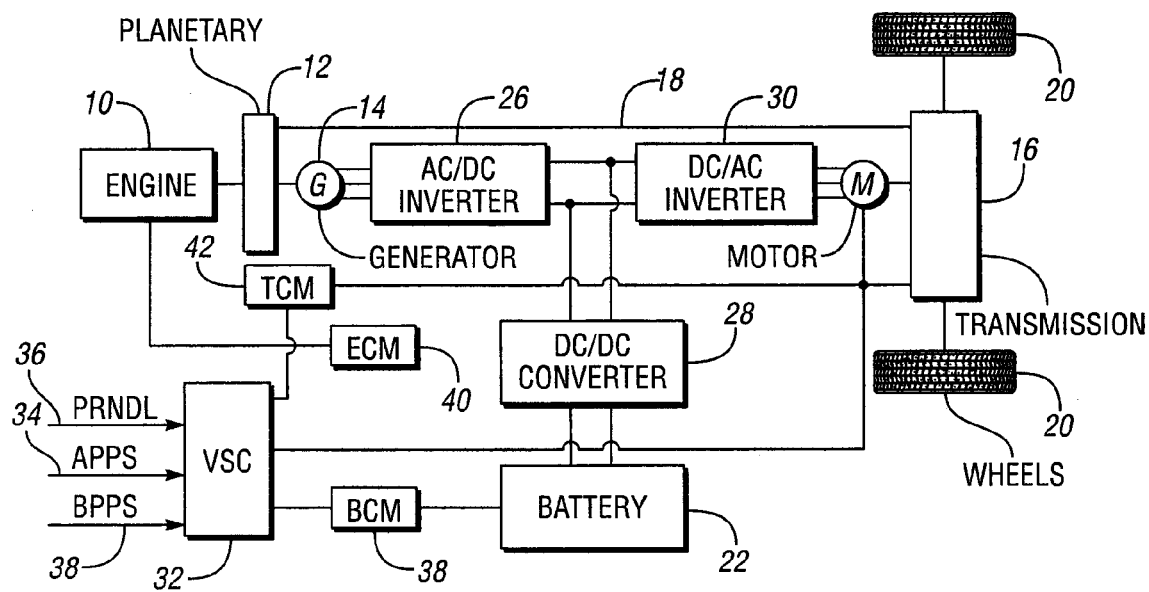
FIG. 1 is a schematic representation of a known hybrid electric vehicle having an engine and a motor in a power-split delivery system.

FIG. 1 shows in schematic form a power-split hybrid electric vehicle, which includes an engine, a battery, a motor, a generator and a split-power gear unit. Engine 10 is mechanically coupled to a power input gear element of a planetary transmission 12. An example of a hybrid electric vehicle powertrain of the type illustrated in FIG. 1 is disclosed in U.S. Pat. No. 6,991,053, which is assigned to the assignee of the present invention. Reference may be made to that patent for a full description of the components of a power-split hybrid electric vehicle powertrain, including the gearing. The gearing may be a planetary gear unit in which the carrier of the planetary gear unit is drivably connected to the engine. The sun gear of the planetary gear unit is drivably connected to a generator 14 and the ring gear may be drivably connected to transmission gearing 16, as shown at 18. The torque output member of the transmission 16 is connected drivably to traction wheels 20.

A battery 22 is electrically coupled to a traction motor 24 and the generator 14 through an AC/DC inverter 26, a DC/DC converter 28, and a DC/AC inverter 30.

A vehicle system controller (VSC) 32 receives powertrain input signals during normal operation, including an accelerator pedal position sensor signal (APPS) 34, a drive range selection signal (PRNDL) 36, and a brake pedal position sensor signal (BPPS) 38. Among its other functions, the vehicle system controller controls a battery control module 38, an engine control module 40 and a transmission control module 42.

Figure 2:
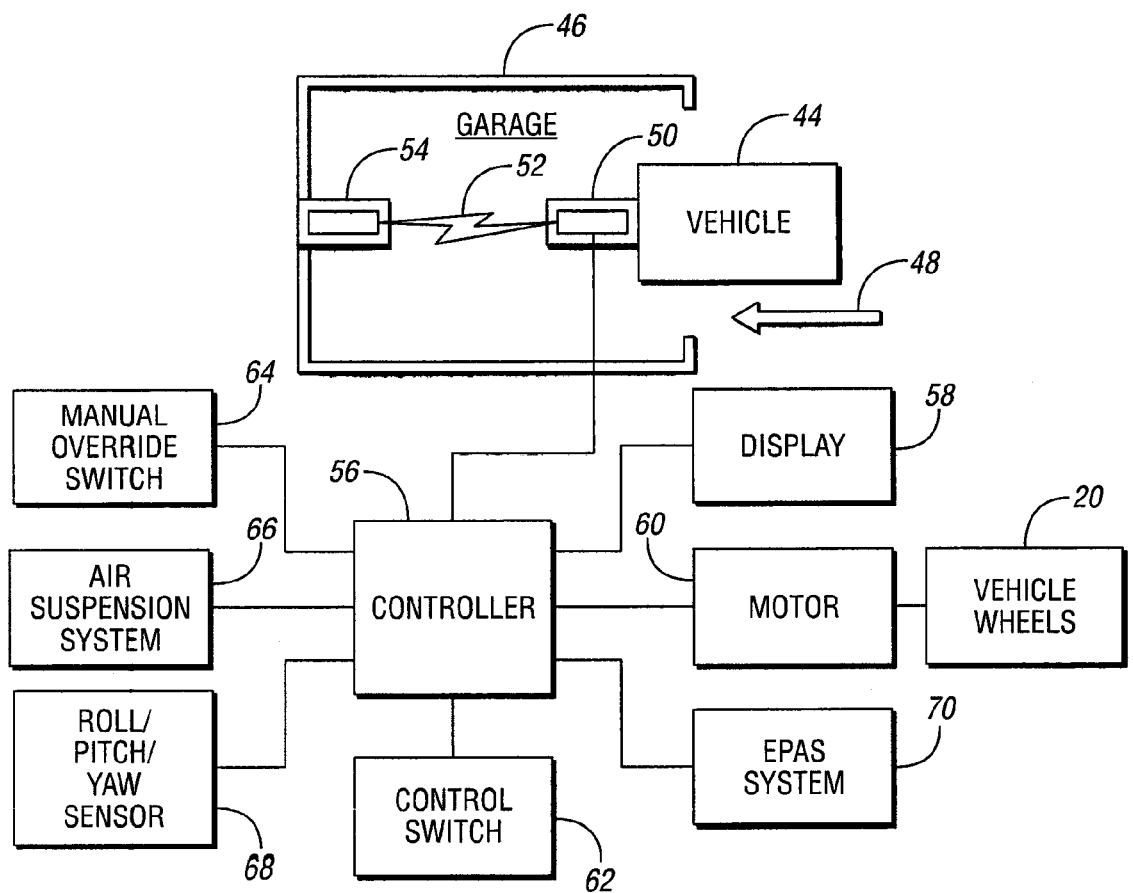
FIG. 2 is a block diagram of the overall auto-seek system.

FIG. 2 shows the portion of the overall control system devoted to the auto-seek feature of the invention. A vehicle that contains a hybrid electric vehicle powertrain with a battery having a partially depleted charge is shown at 44. As the vehicle is being parked in a garage 46, it is advanced in the direction of the directional arrow 48 through a door in garage 46. In one example of an embodiment of the invention, a short range sensor, which may include a receiver such as a (RFID), is part of a connector element mounted on the front of the vehicle, as shown at 50. The electrical connector element for the vehicle, which may include a RF signal antenna, receives a RF signal 52 emitted from a sensor transmitter for the connector element 54 located on a garage wall or at another stationary location. The receiver of the connector element at 50 and the transmitter of the connector element at 54 define vehicle position sensors, as will be explained subsequently. One connector element may be a receptacle or port and the other may be a probe that registers with the port.

The controller 56 seen in FIG. 2 may be part of the vehicle system controller 32 seen in FIG. 1, although it may be a stand-alone controller.

The system of FIG. 2 issues a display to a display assembly 58, which can be located in the vehicle passenger compartment so that the position of the vehicle relative to a target electrical connector element may be viewed as the vehicle advances toward the target.

In the auto-seek mode, the motion of the vehicle is under the control of the electric motor 60, which distributes mechanical power to vehicle traction wheels 20. A control switch 62 under the control of the vehicle operator can activate or deactivate the auto-seek mode.

Further, the driver may over-ride the auto-seek mode as the vehicle advances toward its target by activating a manual over-drive switch 64.

Control of the position of the vehicle as it advances toward the target may be obtained using a known controllable air suspension system for z-axis adjustments, as shown at 66. A roll/pitch/yaw sensor 68 can be used to improve the accuracy of the instructions issued by the controller to the motor.

An electric power assist steering system is illustrated at 70. The steering system 70 is used in a closed loop fashion for obtaining y-axis adjustments as the vehicle traverses its path of motion toward the target. A fluid pressure operated power steering system can be used instead of an electric power assist system to obtain y-axis adjustments. X-axis adjustments of the vehicle, as the vehicle advances toward the target, are obtained using the electric motor 60 under the control of the controller 56.

Figure 3:
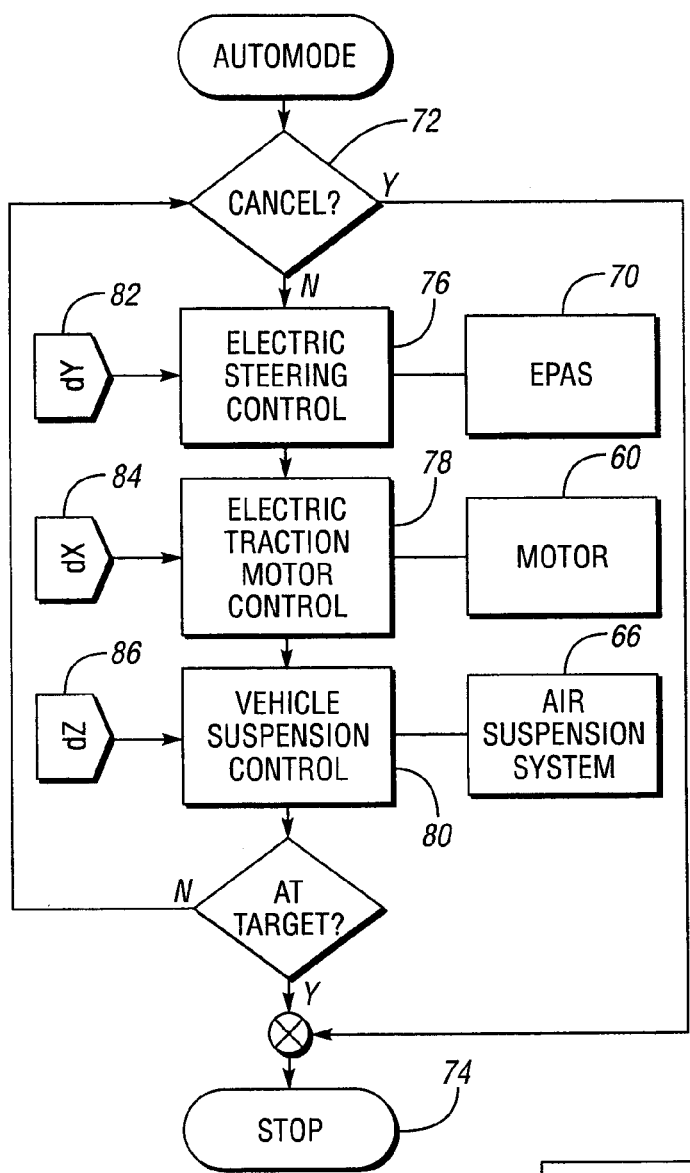
FIG. 3 is a block diagram illustrating implementation of the auto-seek system of the invention wherein the vehicle advances toward a target corresponding to the electric receptacle.

FIG. 3 is a schematic representation in block diagram form of the control functions used during the auto-seek mode. An inquiry is made first at decision block 72 to determine whether the manual over-ride switch is activated. If it is activated, the auto-seek mode will terminate, as shown at 74. If the over-ride switch is not activated, electric steering control shown at 76, electric traction motor control shown at 78 and vehicle suspension control 80 (if z-axis adjustments are needed) will determine during each control loop of the controller 56 an incremental dy adjustment 82, an incremental dx adjustment 84, and an incremental dz adjustment 86. The controller 56 initiates a closed-loop control so that an error between a desired heading and the actual heading is computed in each control loop. The controllable air suspension system, the electric power assist system and the electric motor 60 are activated accordingly.

Figure 5:
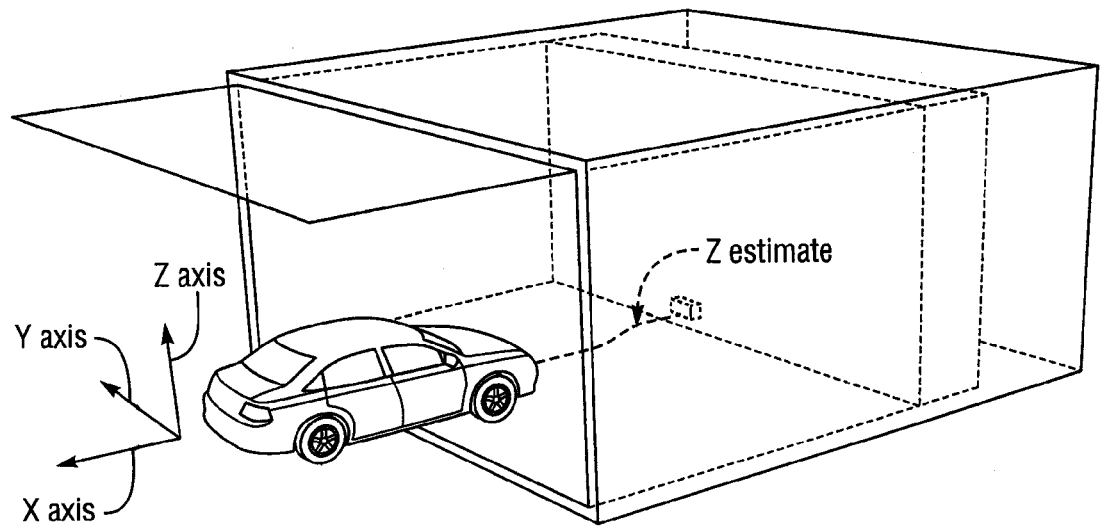
FIG. 5 is a side view of a vehicle in the process of being parked in a garage with the vehicle electrical connector point advancing toward the target.

FIG. 5 illustrates vectors that define the x-axis direction, the y-axis direction and the z-axis direction. The y-axis direction is transverse relative to the vehicle centerline. The x-axis direction is the direction of travel of the vehicle as it advances toward its target, which is the distance between the transmitter and the receiver of the position sensor. The z-axis direction is the direction vertical to the garage floor. It is changed by the controllable suspension system under the control of controller 56. If the garage floor is level, a z-axis adjustment may not be included in the software strategy for the auto-seek mode.

Figure 4:
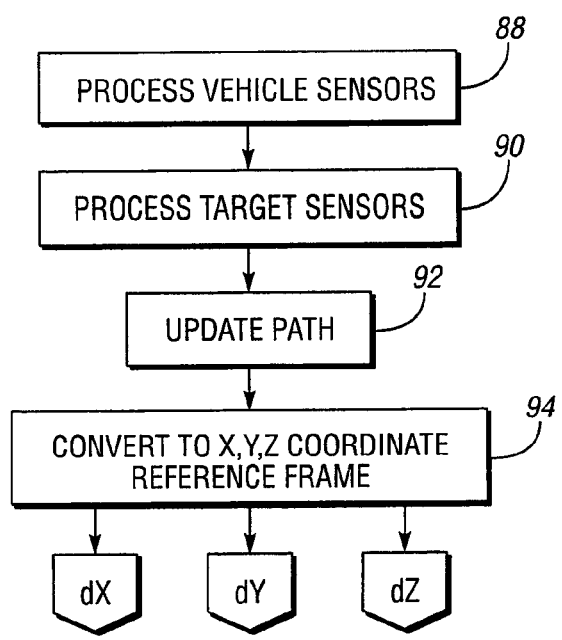
FIG. 4 is a process flow diagram that illustrates the control algorithm used to guide the vehicle electrical connection point toward the target.

FIG. 4 is a block diagram of the overall process steps. Initially, during the control routine of the auto-seek controller, the vehicle sensors are initialized at 88 and the target sensors are initialized at 90. Using information from the vehicle sensors and the target sensors, the path of motion of the vehicle is updated, as shown at 92. Each control loop of the controller will convert data for the x, and z-axes to a coordinate reference frame, as shown at 94, to determine x-axis, y-axis and z-axis adjustments (dx, dy, dz).

FIG. 5 shows a z-axis estimate, which indicates an error between the desired z-axis and the actual z-axis. The error can be brought to zero using a controllable air suspension system under the control of controller 56.

Figure 6:
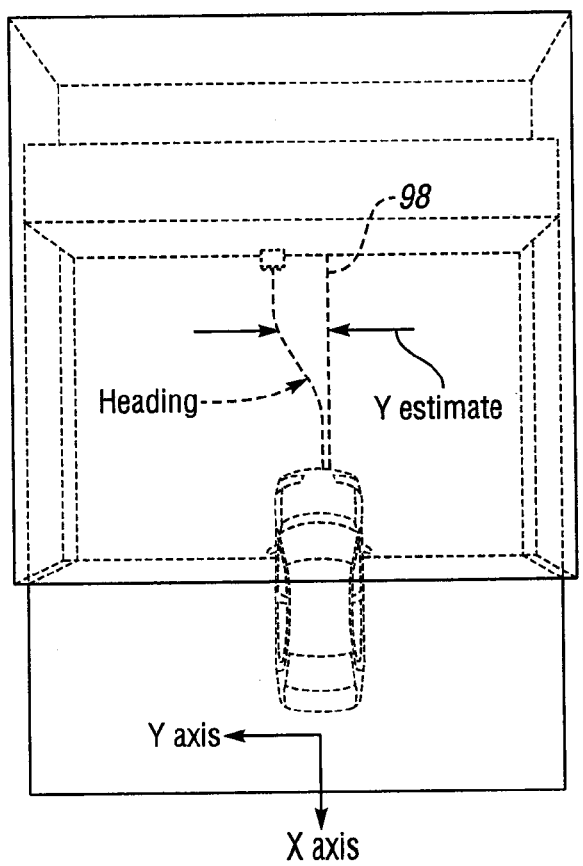
FIG. 6 is a top view of the vehicle and the heading of the vehicle as the vehicle advances toward the target.

As seen in FIG. 6, the estimated error in the y-axis direction is determined by computing the distance between the desired y-axis direction 98 and the actual heading.

In executing a closed-loop software strategy of the auto-seek mode, the control system uses the sensors to detect the position of the grid connector element and then determines a trajectory that maps the position on the vehicle connector relative to the grid connector. X-axis information can be obtained using a conventional forward-looking object detector and, if applicable, a roll/pitch/yaw sensor for roll stability, inclination and height adjustment. The controller then will guide the vehicle along a computed line of travel until the electrical connection elements are aligned. After the connection is made, the vehicle system controller will shut down the auto-seek mode.

The motion of the vehicle in a fore-and-aft direction is obtained using motor power. The steering power assist system is used to steer the vehicle, and a conventional controller air suspension system provides vertical adjustments. It also is possible, using the controller, to anticipate when the auto-seek mode fails and when the connecting elements are misaligned. The vehicle then will be commanded to stop before contact is made.

It is recognized that other electrical connectors could be used if added flexibility is required or added strength is needed to hold the position of the connector elements as contact is made. Adjustments can be made to accommodate variations in position caused by vehicle payload. Estimates can be made further to allow for the use of different vehicles or when the operator desires to park the vehicle in a position other than the position for which initial calibration is made. An optical signal, such as a laser or other retro-reflector signal, can be used.

A radio frequency (RFID) can identify the particular vehicle and provide a timing signal to determine distance based on propagation of time between the time of emission of the signal and the reflection of the signal. Preferably, the receiver is scanned across a field of view using, for example, a gimbal pan and tilt mechanism. The scanner should be sufficiently directional to detect the grid connector element location relative to the position of the vehicle connector element. If desired, the signal transmitter may be designed to respond only when it is signaled, rather than by broadcasting a signal continuously. Either of the connector elements can include a signal transmitter and either can include a signal receiver depending on design choice.

The x-axis distance between the connector elements can be determined also by measuring in a unit of time the rotation of a left front wheel and a right front wheel. This information can be obtained using an electronic wheel count sensor for the left front wheel and for the right front wheel, by adding the two counts together and dividing by two, thereby obtaining an average distance. This is expressed by the following equation:

Distance=$k_1$×(left wheel counts+right wheel counts)
÷2, where $k_1$ is the gain factor.

The wheel counts can be used also to determine the heading using the equation:

Heading=$k_2$×(left wheel counts−right wheel counts)
÷by wheel base, where $k_2$ is a gain factor.

An estimate of the x-axis distance between the connector elements can be obtained using the equation:

x estimate=distance x sin(heading angle).

Likewise, a y-axis estimate is computed using the equation:

y estimate=distance x cos(heading angle).

Original x-axis displacement distance is the x-axis target starting point and the original x-axis displacement distance is the y-axis target starting point.

The incremental x-axis error is: dx=x-axis position along the path of travel minus the x-axis estimate. Likewise, the y-axis error is: dy=y-axis position along the path of travel minus the y-axis estimate.

The pitch sensor obtained from the roll/pitch/yaw sensor is common to vehicles equipped with stability control. It can be used to improve trajectory planning and control of the vehicle's z-axis position or height above the ground or floor as it approaches the target.

The pitch is defined as the angle of the vehicle centerline relative to the ground. If desired, pitch information can also be obtained from an accelerometer that is sensitive to the vehicle longitudinal x-axis acceleration using the vehicle pitch angle (i.e., x-axis−Xaccel: θ=arcsin (Xaccel)). The vehicle's desired x-axis path relative to the stationary plug-in connector element can be corrected if there is a variation caused by non-level road surfaces, such as a driveway or a garage floor. The information from a vehicle yaw sensor could be used to improve alignment of the vehicle with a plug-in connector element to ensure perpendicular approach to the target.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling a battery-powered vehicle having steerable wheels and a power steering system, a motor electrically coupled to the battery for powering vehicle traction wheels and a controllable vehicle suspension system for vertically adjusting the vehicle, the method comprising the steps of:
   determining vehicle position relative to a stationary element of an electrical connector for a utility power grid;
   determining a position of a second element of the electrical connector supported on the vehicle;
   determining relative positions of the stationary element and the second connector element using x-axis, y-axis and z-axis coordinates;
   using the motor to incrementally advance the position of the vehicle in an x-axis direction on a heading toward the stationary connector element;
   using the power steering system to guide the vehicle toward the stationary connector element as vehicle y-axis position adjustments are made to align the connector elements; and
   using the vehicle controllable suspension system to adjust the vehicle incrementally in a z-axis direction as vehicle position adjustments are made to align the connector elements;
   the vehicle thereby being maneuvered with a heading in an auto-seek mode to mechanically connect the connector elements.

2. The method set forth in claim 1 wherein vehicle y-axis position adjustments are made by using differences in wheel rotation of steerable vehicle wheels in a unit of time.

3. A control system for a battery-powered vehicle having steerable wheels and a power steering system, a motor electrically coupled to the battery for powering vehicle traction wheels and an adjustable vehicle suspension system, the control system comprising:

an electrical connector comprising first and second electrical connector parts, one part being mounted on a stationary structure and connected electrically to a power grid, the second part being mounted on the vehicle;

the position of the one connector part relative to the other being identified by target x, y and z axes;

a first vehicle position signal and a second vehicle position signal being exchanged by the connector parts; and a vehicle system controller for receiving the vehicle position signals;

the controller being configured to respond to the position signals to compute a distance in an x-axis direction, a y-axis direction and a z-axis direction between the first and second electrical connector parts, the x, y and z axes defining the vehicle position in a coordinate reference frame;

the motor being activated by the controller to incrementally reduce to zero an error between an actual x-axis vehicle position and a target x-axis vehicle position;

the power steering system being activated by the controller to incrementally reduce to zero an error between an actual y-axis vehicle position and a target y-axis position;

the vehicle suspension system being activated by the controller to incrementally reduce to zero an error between an actual z-axis vehicle position and a target z-axis vehicle position;

the vehicle thereby being maneuvered along a line of travel with a heading that will effect a mechanical coupling of the connector parts and completion of a battery charging circuit.

4. The control system set forth in claim 3 wherein the vehicle position signals are short-range radio frequency signals.

5. The control system set forth in claim 3 wherein the vehicle position signals are optical signals.

6. The control system set forth in claim 3 wherein the position signals are retro-reflective signals.

7. The control system set forth in claim 3 wherein the stationary structure is a vehicle garage wall, the vehicle being maneuvered along a line of travel that allows the connector parts to be coupled as the vehicle moves under battery and motor power following a driving event that partially depletes battery charge.

8. A method for controlling a battery-powered vehicle having a power steering system and a motor electrically coupled to the battery for powering vehicle traction wheels, the method comprising the steps of:

determining vehicle position relative to a stationary element of an electrical connection for a utility power grid;

determining a position of a second element of the electrical connection supported on the vehicle;

the motor being adapted to incrementally advance the position of the vehicle in an x-axis coordinate direction on a heading toward the stationary connector element to align the connector elements;

the power steering system being adapted to guide the vehicle in a y-axis coordinate direction toward the stationary connection element as vehicle y-axis position adjustments are made to align the connection elements;

a vehicle suspension being adapted to adjust the vehicle vertically in a z-axis coordinate direction to align the connector elements; and determining relative positions of the stationary element and the second connection element using at least two of the x-axis, y-axis and z-axis coordinates;

the vehicle thereby being maneuvered with a heading in an auto-seek mode to mechanically connect the connector elements.

9. The method set forth in claim 3 wherein vehicle y-axis position adjustments are made by using differences in wheel rotation of steerable vehicle wheels in a unit of time.

* * * * *